United States Patent
Malcolm et al.

(10) Patent No.: US 6,385,179 B1
(45) Date of Patent: May 7, 2002

(54) PACKET AND CIRCUIT SWITCHED COMMUNICATION NETWORK METHOD AND APPARATUS

(75) Inventors: Richard J. Malcolm, Carol Stream; Daniel F. Tell, Lake Forest; Thomas J. Joyner, Chicago; William S. Pierce, Algonquin, all of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/448,906

(22) Filed: Nov. 24, 1999

(51) Int. Cl.[7] .............................. H04Q 7/00
(52) U.S. Cl. ............... 370/329; 370/341; 370/352
(58) Field of Search ................. 370/352, 353, 370/354, 355, 356, 357, 328, 329, 330, 338, 341, 237, 465

(56) References Cited

U.S. PATENT DOCUMENTS

| 5,533,019 A | * | 7/1996 | Jayapalan | 370/60.1 |
| 5,889,954 A | * | 3/1999 | Gessel et al. | 359/200.53 |
| 5,970,417 A | * | 10/1999 | Toyryla et al. | 455/519 |
| 6,144,670 A | * | 11/2000 | Sponaugle et al. | 370/401 |
| 6,226,523 B1 | * | 5/2001 | Karlsson et al. | 455/466 |

OTHER PUBLICATIONS

"TIA/EIA/IS–634.0 revision A (IS–634.000A)—Base Part", Steve Jones—NEC America and Mike Dolan—Lucent Technologies Inc., Publication Version May 29, 1998.

* cited by examiner

*Primary Examiner*—Chau Nguyen
*Assistant Examiner*—Soon-Dong Hyun
(74) *Attorney, Agent, or Firm*—Sayed Hossain Beladi; Steven A. May

(57) ABSTRACT

A communication system (100) having packet and circuit switched networks (102 and 101) provides connection between at least a first and a second end users by establishing a call connection via a radio access network (105), establishing a control channel associated the call connection between radio access network (105) and packet switched network (102) through a first packet switched connection, selecting one of packet and circuit switched networks (101 and 102) for establishing a traffic channel associated with the call connection, and routing the traffic channel through said selected network while maintaining the control channel through packet switched network (102).

9 Claims, 3 Drawing Sheets

PACKET AND CIRCUIT SWITCHED COMMUNICATION NETWORK METHOD AND APPARATUS

RELATED FIELD OF THE INVENTION

The invention relates to the field of communications in circuit and packet switched networks.

BACKGROUND OF THE INVENTION

Circuit and packet switched networks have been traditionally used as separated networks with limited interaction and limited flexibility in selecting the appropriate network to route and process a service connection. With the advance of the telecommunication technologies, circuit and packet switched networks are converging into one network providing communication services to service subscribers. Such service subscribers are either land-based end users or wireless end users and require a flexible and reliable service connection regardless of the underlying network technology.

Traditionally, there is a fixed hierarchical relationship between the network elements in a communication network. This fixed relationship limits the flexibility on routing decisions for selecting an appropriate service control network by forcing service requests to be routed to a fixed service control element. Service control is limited to what is provided by that fixed service control element. There is a need to break the hierarchical dependency and move towards a peer to peer relationship to allow for more flexible and optimized service control options for both the network operator and the subscriber.

For service networks that contain both circuit switched and packet switched options, the subscriber (or the subscriber unit) traditionally must select the circuit or the packet network with limited information of which network is the most suitable for processing the service request. There is a need for a dynamic, context sensitive method that uses provisioned data and dynamic data available in the network to make informed decisions on the appropriate network to select for subscriber service requests.

Therefore, there is a need for an efficient and flexible selection of circuit or packet switched network in a communication system for providing a call connection originated from a subscriber unit.

DETAILED DESCRIPTION OF THE PREFERRED EMBODIMENT(s)

Figure 1:
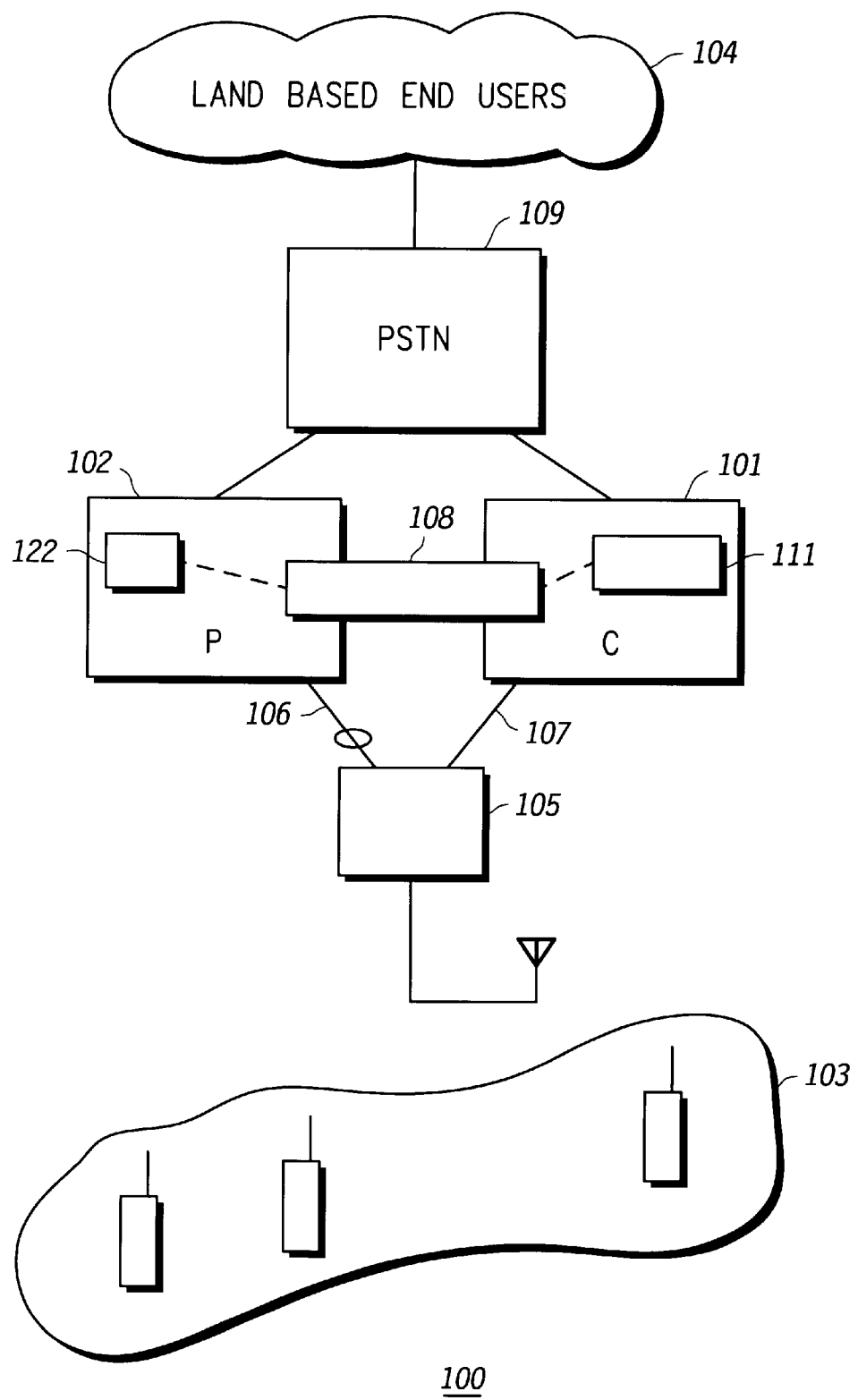
FIG. 1 depicts a block diagram of a communication system incorporating circuit and packet switched networks operating according to various aspects of the invention.

Referring to FIG. 1, a communication system 100 according to various aspects of the invention is shown. Communication system 100 has a packet switched network portion 102 and a circuit switched network portion 101 each capable of providing connection between a plurality of end users. Such end-users include wireless end users 103 and land-based end users 104. The circuit and packet switched network portions 101 and 102 respectively may not easily be separable because they may have several inter-dependent operations and blocks. The circuit and packet switched network portions 101 and 102 respectively are shown for clarity and ease of explanation. The invention includes establishing a call connection between a first user and a radio access network 105. The first end user is at least one of the wireless end users 103. Radio access network 105 is connected to packet and circuit switched network portions 102 and 101 respectively through a first packet switched connection 106 and a first circuit switched connection 107. A control channel associated with call control of the call connection is established between radio access network 105 and packet switched network 102 through packet switched connection 106. A packet switched based call control 122 may be responsive to the control channel. The call control 122 preferably is controlled and resides in the packet switched network portion 102 of the communication system 100. One of packet and circuit switched networks 102 and 101 is selected for establishing a traffic channel associated with the call connection. The traffic channel is established and routed through the selected network. The selected network may be either one of packet and circuit switched networks 102 and 101. According to the invention, the control channel established over packet switched connection 106 remains as such even though circuit switched network 101 may have been selected.

If the call connection is destined for a second end user in the land-based end users section 104, the call connection is ultimately routed through a public switched network (PSTN) for appropriate connection. Communication system 100 may be a cellular communication system operating according to any of the known standards. A few of such standards includes Global System for Mobiles, Code Division Multiple Access (CDMA) Interim Standards 95 and its various versions, and Wide CDMA system standards. Such standards are commonly known to one ordinary skilled in the art. In case the communication system 100 is a cellular communication system, the circuit switched network portion may a mobile switching center. Wireless end users 103 may be any group of cellular subscribers with capacity to communicate to radio access network 105. The inter-working of a communication system that includes both a circuit switched and packet switched networks are shown and described in publication TIA/EIA/IS-634, which is incorporated by reference herein.

According to the invention, when circuit switched network 101 is selected, the control channel is routed from packet switched network 102 to circuit switched network 101 via a network gateway 108 dedicated for interface between circuit and packet switched networks 101 and 102. Network gateway 108 emulates a circuit switched call control while maintaining the traffic channel through the selected circuit switched network 101. The traffic channel may carry at least one of voice and data information through at least one of packet and circuit switched network portions 102 and 101.

Figure 2:
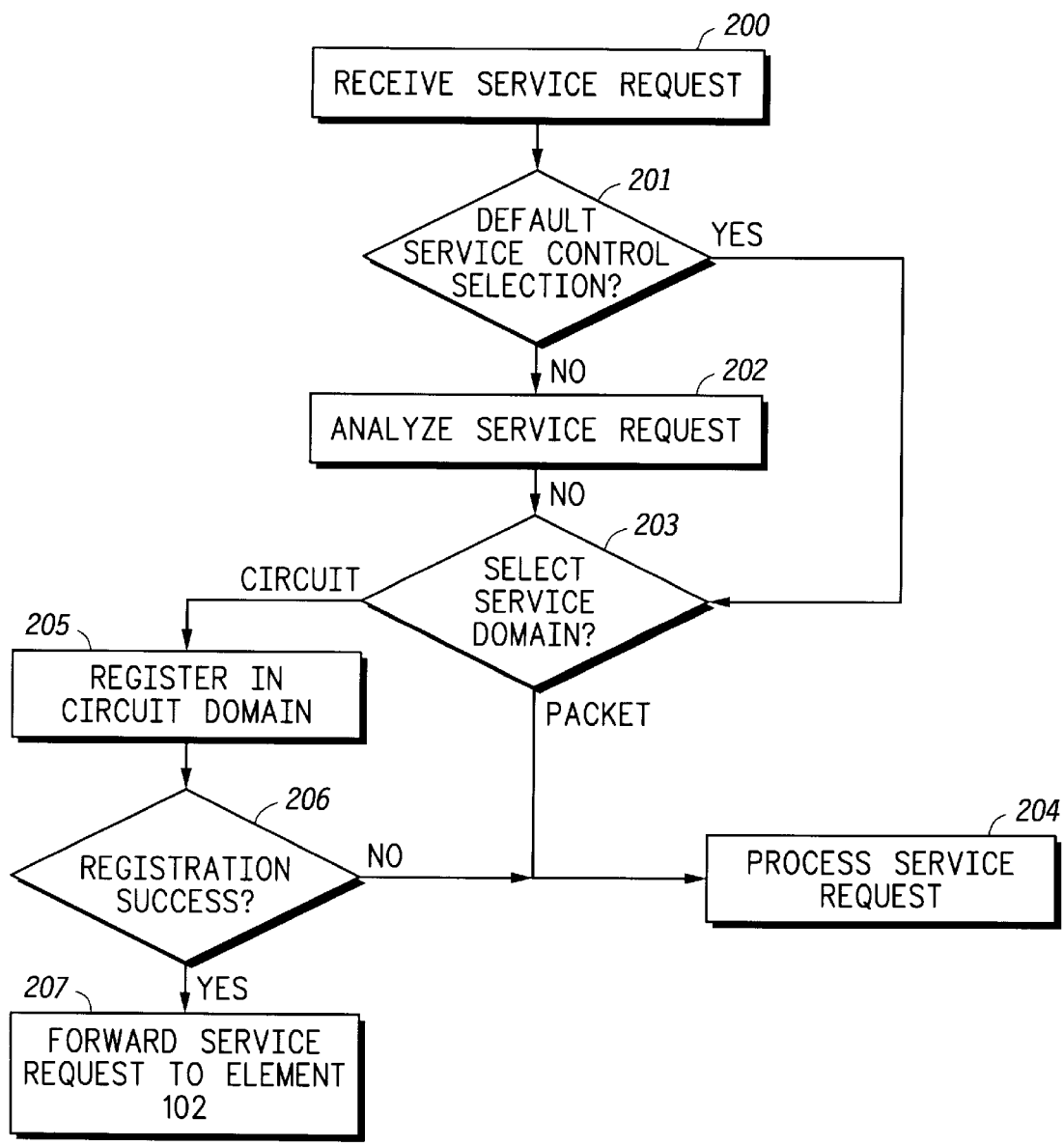
FIG. 2 depicts a flow chart for selecting a network service according to various aspects of the invention.

FIG. 2 depicts an exemplary representation of the invention. Upon entering a coverage area, the mobile station initiates a registration operation to inform communication system 100 of its presence. In the heterogeneous packet and circuit switched environment, this is directed to the packet switched based call control 122. Once at step 200 a service request is received by call control 122, the service control domain can be selected. At step 201, it is determined whether a default control domain is applied by checking the subscriber service profile and the selection rules database. If a default selection is identified, the packet switched based call control 122 moves directly to step 203. Otherwise, the service request is parsed and the specific data is used with the selection rules to generate a selection score at step 202. At Step 203, the selection score is checked. If the packet switched network 102 domain is indicated, the packet switched based call control 122 moves to step 204 and progresses the service request according to the appropriate service logic. Otherwise, the packet switched based call control 122 acts as a proxy for the mobile subscriber 103 and issues a registration request at a step 205 to a circuit switched based call control 111 based in the circuit switched portion 101. This populates circuit switched network portion 101 with the subscriber service profile and allows it to control the subscriber busy status. At step 206, the status of the registration procedure is checked for success. If it is succeeded, packet switched based call control 122 forwards the service request to circuit switched based call control 111 at step 207. Otherwise, packet switched based call control element 122 moves to step 204 and advances the call accordingly. This may include delivering the requested service or application of appropriate recorded announcements if the call cannot proceed.

Figure 3:
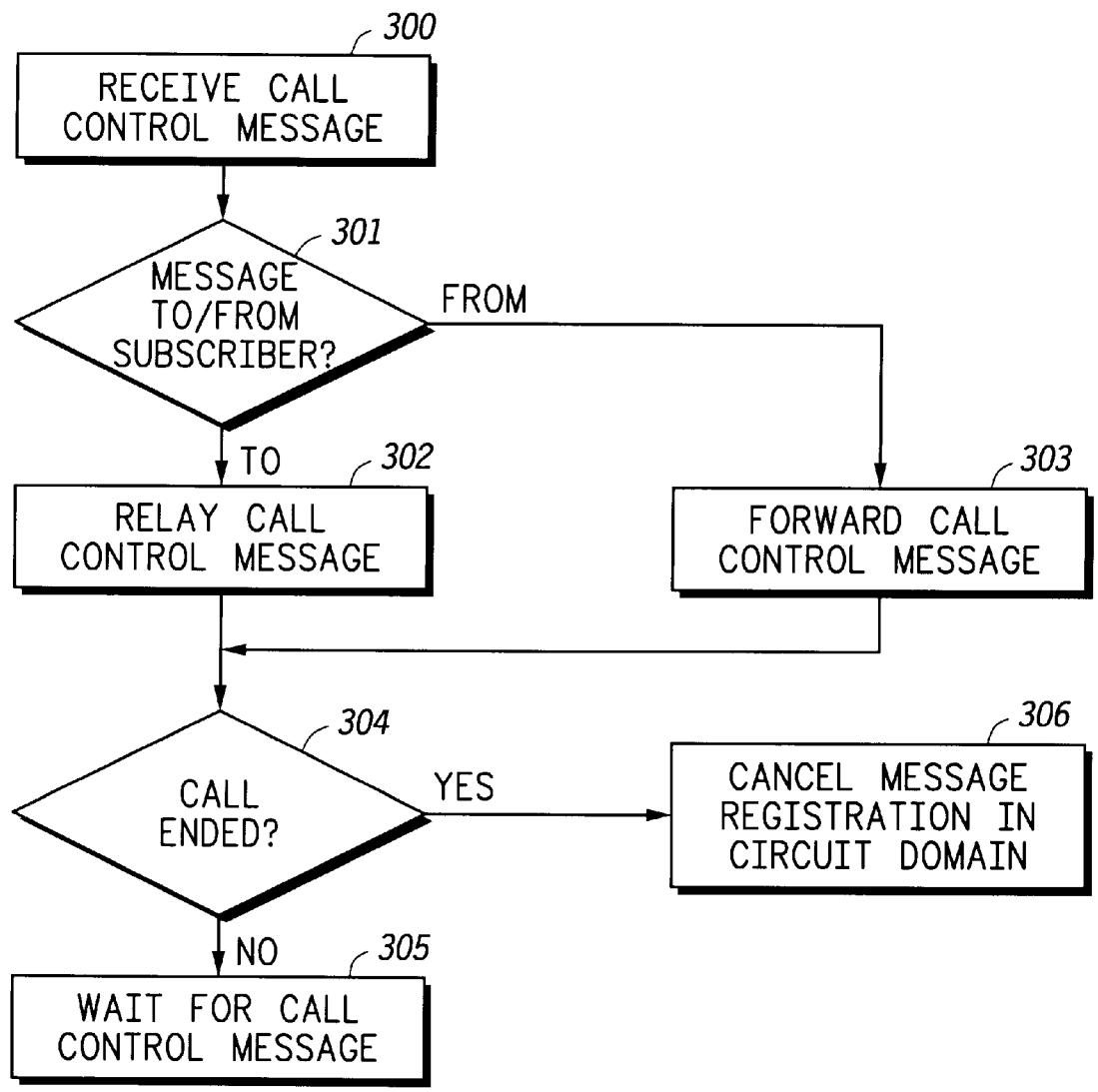
FIG. 3 depicts a flow chart for selecting a network service with a call in progress according to various aspects of the invention.

FIG. 3 depicts a call processing while an initiated service request remains active and the selected service domain is the circuit switched network portion 101. First at step 300, a call control message is received. Step 301 checks to see if the message was sent by circuit switched based call control 111 or access network controller 105. If the message is from call control 111, it relays the message to the access network controller 105 at step 302. Otherwise at step 303, the message is forwarded to circuit witched call control 111. At step 304, the call control message is analyzed to determine if the service request has terminated. If not, the packet switched call control 122 waits for the next control message at step 305. Otherwise step 306, the packet control element cancels the registration with circuit switched based call control 111.

Selection of either one of packet and circuit switched networks 102 and 101 may be based on a criteria including at least one of the first user service request type, a quality of service, a location of the second user connection, a time of day when the call connection is being established, a date of week when the call connection is being established, the first user subscription preference in communication system 100, and a load balancing scheme being implemented for managing traffic flows in communication system 100.

Network operators with an installed base of circuit switched subscribers require a reliable and controlled transition when migrating subscribers from their circuit switched network to their newer, packet switched network. According to various aspects of the invention, in addition to providing seamless subscriber features when migrating subscribers to the packet switched network, the network operator can introduce new features in the packet switched network in a controlled fashion for a subset of subscribers without impacting the entire installed subscriber base. Selection of a circuit or packet switched network is based on several criteria including a subscriber subscription profile which indicates the subscriber's network preference. The network operator can modify this profile for a smooth migration of a subscriber or group of subscribers between networks.

It may be not necessary to emulate the call control in gateway 108. Gateway 108 handles conversion from a packet transport media to a circuit transport media, and in opposite direction. The gateway 108 relays signaling to/from the circuit switched based call control 111 and packet switched based call control 122 which is providing the call control. Upon receipt of a call origination request from radio access network 105, call control 122 will analyze the request. The requesting subscriber may have a service profile and network traffic loading in order to select the desired service delivery domain, packet or circuit switched network portions 102 and 101. The packet switched based call control 122 forwards the call control signaling to the circuit switched based call control 111 which progresses the call according to its embedded call control logic. Call control 111 issues appropriate signaling message to packet switched based call control 122. The message determines radio access network control 105 as a destination for call control from a user to another user in user group 103. Call control 122 relays the message to radio access network control 105.

What is claimed is:

1. In a communication system having packet and circuit switched networks providing connection between at least a first and a second end users, a method comprising the steps of:

establishing a call connection between said first user and a radio access network, wherein said radio access network is connected to said packet and circuit switched networks through a first packet switched and a first circuit switched connections respectively;

establishing a control channel, associated with call control of said call connection, between said radio access network and said packet switched network through said first packet switched connection;

selecting one of said packet and circuit switched networks for establishing a traffic channel associated with said call connection, wherein said selecting is based on a criteria comprising at least one of a first user service request type, a quality of service, a location of said second user connection, a time of day when said call connection is being established, a date of week when said call connection is being established, a first user subscription preference in said communication system, and a load balancing scheme implemented for managing traffic flows in said communication system;

establishing said traffic channel;

routing said traffic channel through said selected network; and when said selected network is said circuit switched network, routing said control channel from said packet switched network to said circuit switched network via a network gateway dedicated for interface between said circuit and packet switched networks.

2. The method as recited in claim 1 further comprising the step of:

emulating a circuit switched call control at said network gateway while maintaining said traffic channel through said selected circuit switched network.

3. The method as recited in claim 1 wherein said traffic channel carries at least one of voice and data information.

4. In a communication system having packet and circuit switched networks providing connection between at least a first and a second end users, a method comprising the steps of:

establishing a call connection between said first user and a radio access network, wherein said radio access network is connected to said packet and circuit switched network through a first packet switched and a first circuit switched connections respectively;

establishing a control channel, associated with call control of said call connection, between said radio access network and said packet switched network through said first packet switched connection;

routing a traffic channel associated with said call connection through said packet switched network;

selecting said circuit switched network for re-rerouting said traffic channel, wherein said selecting is based on a criteria comprising at least one of a first user service request type, a quality of service, a location of said second user connection, a time of day when said call connection is being established, a date of week when said call connection is being established, a first user subscription preference in said communication system, and a load balancing scheme implemented for managing traffic flows in said communication system;

re-routing said traffic channel through said circuit switched network;

routing said control channel from said packet switched network to said circuit switched network via a network gateway dedicated for interface between said circuit and packet switched network; and emulating a circuit switched call control at said network gateway while maintaining said traffic channel through said circuit switched network.

5. The method as recited in claim 4 wherein said traffic channel carries at least one of voice and data information.

6. In a communication system having packet and circuit switched networks providing connection between at least a first and a second end users, an apparatus comprising:

means for establishing a call connection between said first user and a radio access network, wherein said radio access network is connected to said packet and circuit switched network through a first packet switched and a first circuit switched connections respectively;

means for establishing a control channel, associated with call control of said call connection, between said radio access network and said packet switched network through said first packet switched connection;

means for selecting one of said packet and circuit switched networks for establishing a traffic channel associated with said call connection, wherein said selecting is based on a criteria comprising at least one of a first user service request type, a quality of service, a location of said second user connection, a time of day when said call connection is being established, a date of week when said call connection is being established, a first user subscription preference in said communication system, and a load balancing scheme implemented for managing traffic flows in said communication system;

means for establishing said traffic channel;

means for routing said traffic channel through said selected network; and when said selected network is said circuit switched network, means for routing said control channel from said packet switched network to said circuit switched network via a network gateway dedicated for interface between said circuit and packet switched networks.

7. The apparatus as recited in claim 6 further comprising a means for emulating a circuit switched call control at said network gateway while maintaining said traffic channel through said selected circuit switched network.

8. In a communication system having packet and circuit switched networks providing connection between at least a first and a second end users, an apparatus comprising:

means for establishing a call connection between said first user and a radio access network, wherein said radio access network is connected to said packet and circuit switched network through a first packet switched and a first circuit switched connections respectively;

means for establishing a control channel, associated with call control of said call connection, between said radio access network and said packet switched network through said first packet switched connection;

means for routing a traffic channel associated with said call connection through said packet switched network;

means for selecting said circuit switched network for rerouting said traffic channel, wherein said selecting is based on a criteria comprising at least one of a first user service request type, a quality of service, a location of said second user connection, a time of day when said call connection is being established, a date of week when said call connection is being established, a first user subscription preference in said communication system, and a load balancing scheme implemented for managing traffic flows in said communication system;

means for rerouting said traffic channel through said circuit switched network;

routing said control channel from said packet switched network to said circuit switched network via a network gateway dedicated for interface between said circuit and packet switched network; and means for emulating a circuit switched call control at said network gateway while maintaining said traffic channel through said circuit switched network.

9. In a communication system having packet and circuit switched networks providing connection between at least a first and a second end users, a method comprising the steps of:

establishing a call connection between said first user and a radio access network, wherein said radio access network is connected to said packet and circuit switched network through a first packet switched and a first circuit switched connections respectively;

registering said first user with said packet switched network;

establishing a control channel, associated with call control of said call connection, between said radio access network and said packet switched network through said first packet switched connection;

selecting one of said packet and circuit switched networks for establishing a traffic channel associated with said call connection based on said first user profile stored in a database in said packet switched network, wherein said selecting is based on a criteria comprising at least one of a first user service request type, a quality of service, a location of said second user connection, a time of day when said call connection is being established, a date of week when said call connection is being established, a first user subscription preference in said communication system, and a load balancing scheme implemented for managing traffic flows in said communication system;

establishing said traffic channel;

routing said traffic channel through said selected network; and transferring said first user registration from said packet switched network to said circuit switched network when said circuit switched network is selected.

* * * * *